Feb. 6, 1968 W. H. BIBBENS 3,367,462

TORQUE TRANSMITTER WITH YIELDABLE TEETH

Original Filed Jan. 22, 1964 5 Sheets-Sheet 1

INVENTOR.
WILLIAM H. BIBBENS
BY
Gregory S. Dolgorukov
ATTORNEY

INVENTOR.
WILLIAM H. BIBBENS
BY
Gregory S. Dolgorukov
ATTORNEY

TORQUE TRANSMITTER WITH YIELDABLE TEETH

Original Filed Jan. 22, 1964 5 Sheets-Sheet 3

INVENTOR.
WILLIAM H. BIBBENS

BY
Gregory S. Dolgorukov
ATTORNEY

INVENTOR.
WILLIAM H. BIBBENS
BY
Gregory S. Dolgorukov
ATTORNEY

INVENTOR.
WILLIAM H. BIBBENS
BY
Gregory S. Dolgorukov
ATTORNEY

United States Patent Office 3,367,462

Patented Feb. 6, 1968

3,367,462

TORQUE TRANSMITTER WITH YIELDABLE TEETH

William H. Bibbens, Birmingham, Mich. (16500 North Park Drive, North Park Towers, Apt. 820, Southfield, Mich. 48075)

Original application Jan. 22, 1964, Ser. No. 339,374. Divided and this application Feb. 27, 1967, Ser. No. 618,633

1 Claim. (Cl. 192—55)

The present application is a division of my co-pending application, Ser. No. 339,374, filed on Jan. 22, 1964, for Toothed Members.

This invention relates to toothed machine elements or members such, for instance, as gears and splines, and more particularly, but not exclusively, to such members forming parts of motor vehicle transmissions and similar devices.

It has been found through experience of many years that a set of toothed machine elements or members such as two external gears, an internal gear and an external gear, an internal spline and an external spline, where one or both of such elements is axially movable for the purpose of selective engagement and disengagement, have an undesirable and objectionable tendency to disengage in operation while transmitting torque loads. Such a condition is very frequently observed in motor vehicle transmission where it not only causes various difficulties but presents serious danger in many situations, such, for instance, when driving a motor vehicle along mountain roads, and particularly when coasting downhill and using the vehicle engine as a brake. Disengagement of vehicle transmission on a downhill curve would cause a sudden loss of the braking action of the engine, and might cause an accident before the driver could realize what happened and apply the brakes.

Various scientific theories have been offered to explain the phenomenon of disengagement of such engaged or meshing members, but none of them appear to give a complete explanation. While I do not wish to be bound by any theory or explanation, it is my present understanding and/or belief that such disengagement is the result of gradual creeping of the slidable element or member due to the combined effect of load forces, vibration, deflection of the transmission structure and resiliency of the materials themselves, resulting in producing a force component acting in the axial direction and axial thrust of short duration with every vibration impulse, leading to such disengagement.

Various means have been offered to prevent self-disengagement of such members. While some of such means appear to reduce the tendency of such self-disengagements, at least for a limited period of time, they have a number of serious disadvantages such as requiring performance of special machining operations on such members, which operations are very costly and result in irreparable and undesirable modifications on the members, particularly such as cutting deeply into the roots of the teeth by the cutters with the aid of which such manufacturing operations are performed.

One of the objects of the present invention is to provide an improved construction of two meshing toothed elements or members, whereby the above difficulties and disadvantages are overcome and largely eliminated without introducing new problems and not only without increasing the cost involved but effecting cost savings and simplifying manufacturing methods.

Another object of the invention is to provide an improved motor vehicle transmission including a toothed clutch and/or including other toothed driving members, said clutch comprising two toothed elements, with one or both of said elements being axially shiftable for selective engagement and disengagement, improved means being provided whereby the slidable element acquires tendency to stay in full and safe engagement with the other element and thus making the transmission fully reliable under various operational conditions.

It is a further object of the present invention to provide a self-improving combination of engageable toothed members in which, as the members are being run in by use, the distribution of the load forces from the teeth of the driving member to the teeth of driven member progressively improves in uniformity around the entire 360 degrees of the peripheries of the respective members.

It is a further object of the present invention to provide an improved combination of engageable toothed elements or members which, as the members are being run in by use, the axial and the tangential components of the load forces are transmitted from the teeth of driving element to the teeth of the driven element at substantially line contacts, with the high spot contacts carrying proportionately higher loads, but after the elements are broken in by use and the mutual wear of the members occurs at the places of substantially line contacts, contacts thereat gradually become limited area contacts and loads become substantially equally distributed between all of the teeth in contact.

It is a further object of the present invention to provide an improved combination of engageable toothed elements of the nature specified above, in which the limited area contacts between the respective engaged teeth are greatly increased in their areas of contact, when impact loads occur at said contacts and while maintaining high stressed areas at the corners, hold the resulting deflection of the teeth within the elastic limits of their materials.

A further object of the present invention is to provide an improved combination of toothed machine elements or members adapted for engagement and disengagement by axial movements, with said elements tending in operation to adjust themselves to a certain predetermined holding position thus providing the desired safe engagement and self-seeking of the predetermined position should such position be disturbed.

A still further object of the present invention is to provide an improved combination of toothed machine elements or members adapted for selective engagement and disengagement by axial movements of one or both of said elements, the tooth faces of at least one of said elements being so shaped that the elements tend in operation to adjust themselves to a predetermined intermediate position between two extreme positions, or at a holding position determined by additional stop means within themselves.

A still further object of the present invention is to provide an improved construction of the nature specified in the preceding paragraph which can be machined in an acceptable and practicable manner.

Further objects and advantages of this invention will be apparent from the following description and appended claim, reference being had to the accompanying drawings forming a part of this specification, wherein like reference characters designate corresponding parts in the several views.

Figure 3:
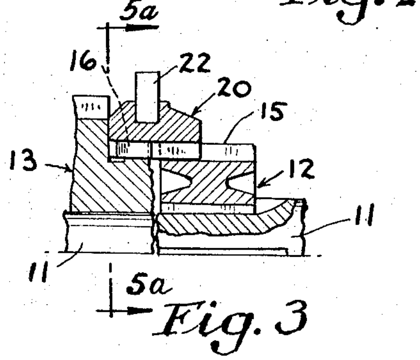
FIG. 3 is a view similar in part to FIG. 2 but with the toothed elements shown engaged.
Figure 5:
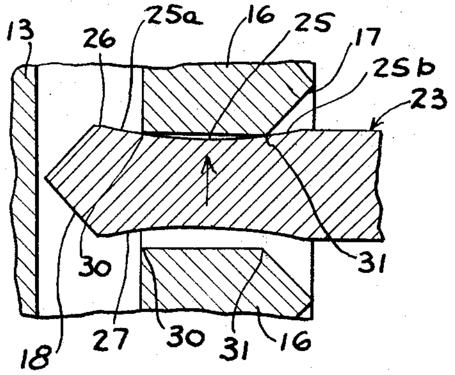
FIG. 5 is a diagrammatic sectional view showing on a large scale the portions of the toothed elements in self-centering operative contact.
Figure 5A:
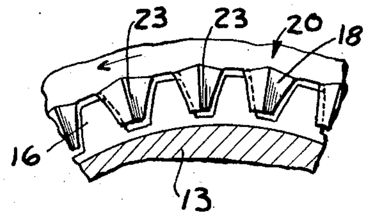

FIG. 5*a* is a fragmentary sectional view taken in the direction of the arrows on the section plane passed through the line 5*a*—5*a* of FIG. 3 in driving condition.

Figure 6:
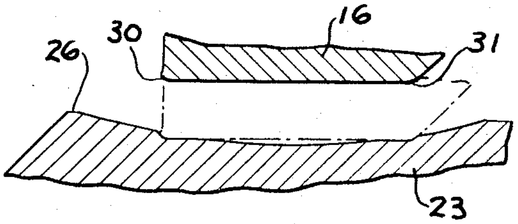

FIG. 6 is a fragmentary view showing the portions of the elements illustrated in FIG. 5 but on a still larger scale and with the element showing mutual wear at the places of contact and the holding position of elements established thereby.

Figures 7, 8:
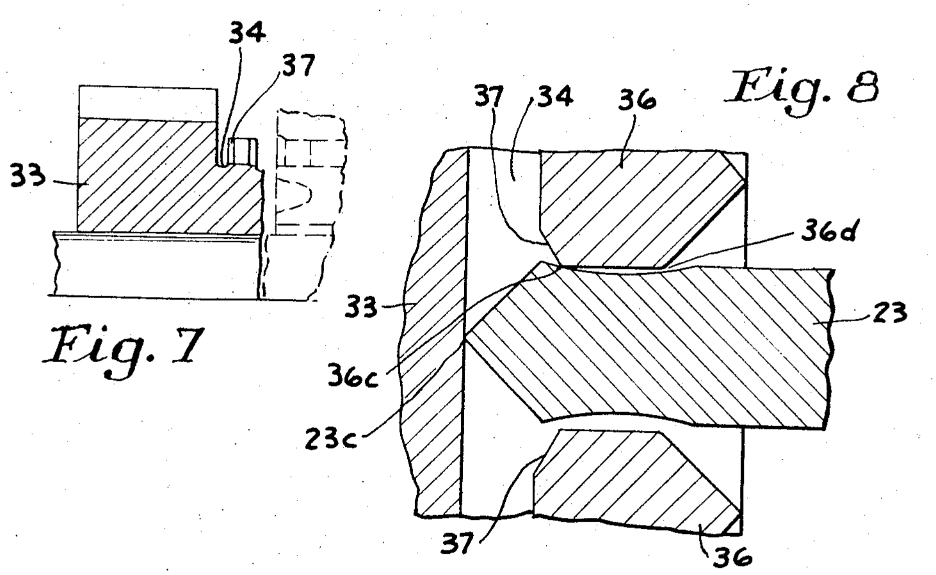

FIG. 7 is a fragmentary view, partly in section, showing a gear member with a narrower than usual neck or undercut between the gear body and the external clutch teeth engageable by the shiftable member.

FIG. 8 is a diagrammatic sectional view illustrating a construction similar in part to FIG. 5 but showing positive positioning of the engaging faces of the toothed elements for the condition illustrated in FIG. 7.

Figure 9:
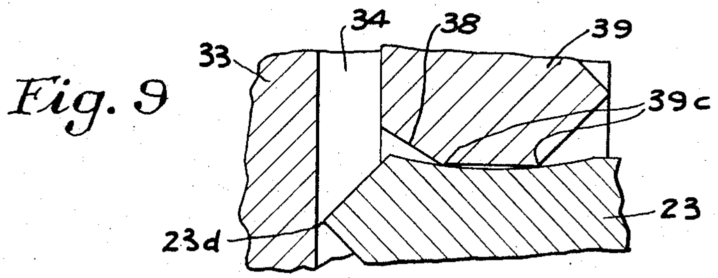

FIG. 9 is a view similar in part to FIG. 5, showing modification of the tooth faces to produce self-centering for the condition of FIG. 7.

Figure 10:
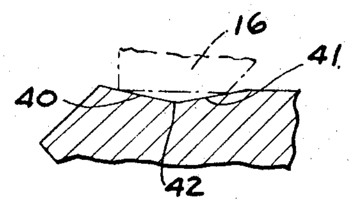
Figure 11:
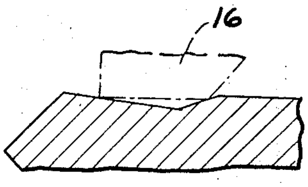

FIGS. 10 and 11 show further modifications of the internal tooth faces of the toothed elements for self-centering operation.

Figure 12:
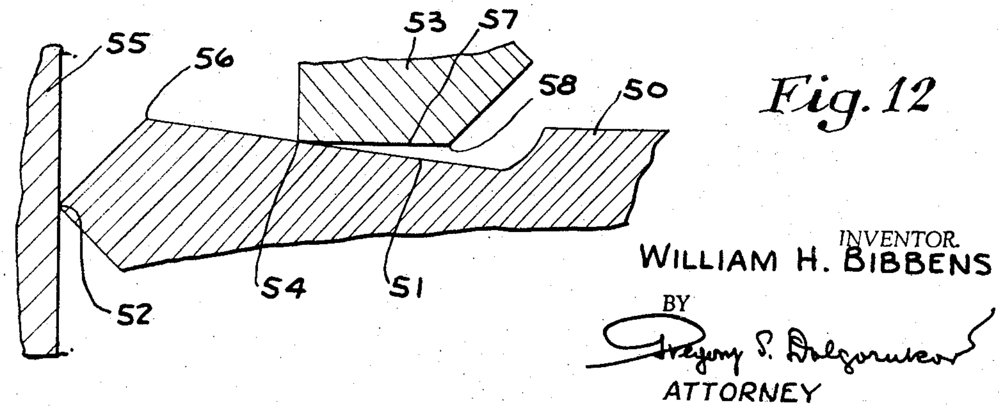

FIG. 12 is a diagrammatic view similar in part to FIG. 11 but showing internal tooth including an inclined plane disengagement-resisting ramp limited at its base by a fillet and employing positive positioning.

Figures 13, 14, 15:
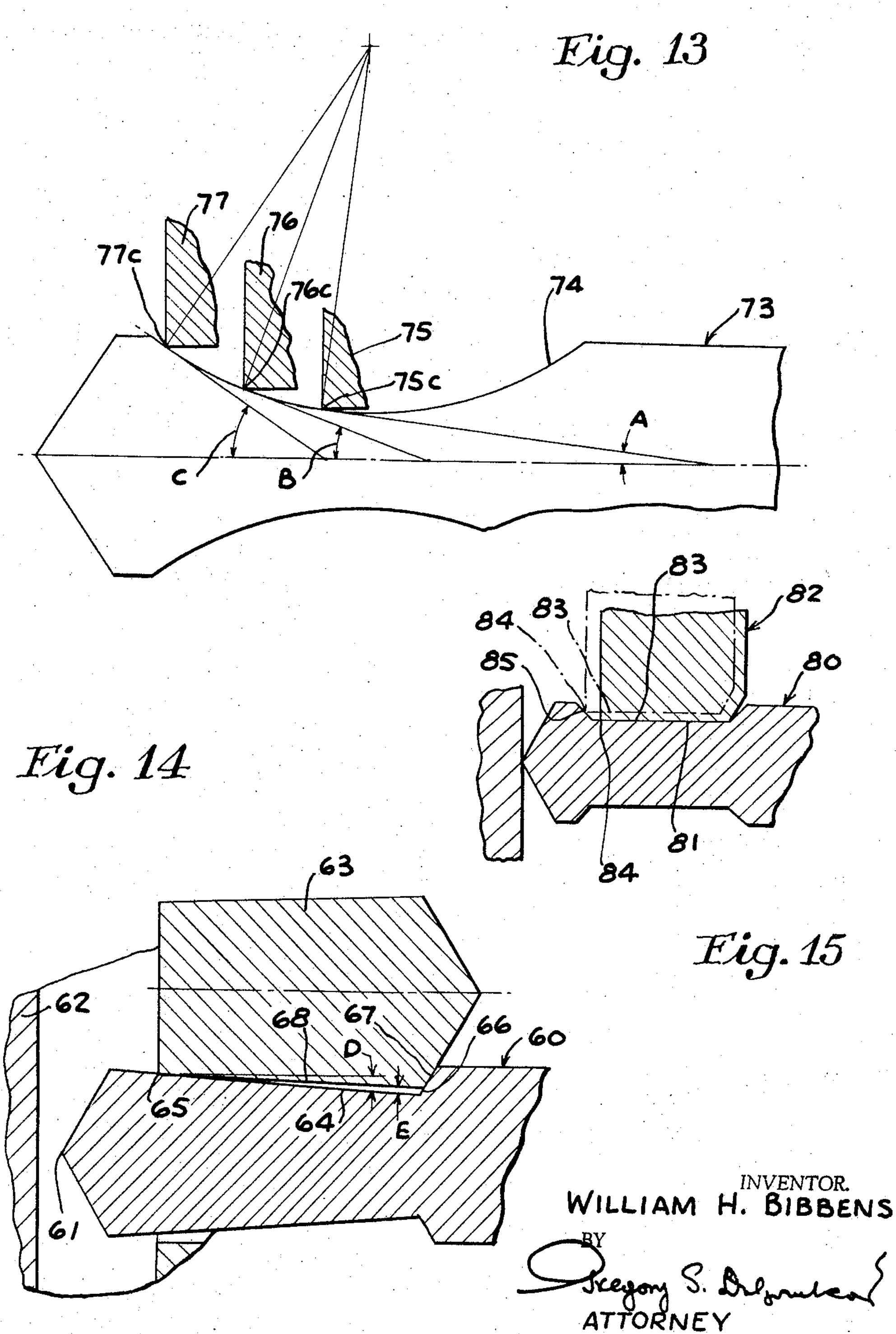

FIG. 13 is a diagrammatic view illustrating in a greatly exaggerated manner the increase in resistance to disengaging forces acting on the engaged members, which increase results from the increase of tangential angle at the line of tooth contact between the contacting teeth as said line moves up the arcuate wall of the recess in the face of the mating tooth.

FIG. 14 is a view similar in part to FIG. 12 but showing a construction in which the controlled clearance between engaging teeth is so selected that in cases of impact loads the load transmitting contacts are greatly increased in their respective areas and may become momentarily full surface-to-surface contacts.

FIG. 15 is a view similar in part to FIG. 5 but showing a construction in which the contacts between engaging teeth are substantially surface-to-surface contacts, but which become line or substantially line contacts after disengaging axial movement of the toothed elements begins.

Figure 16:
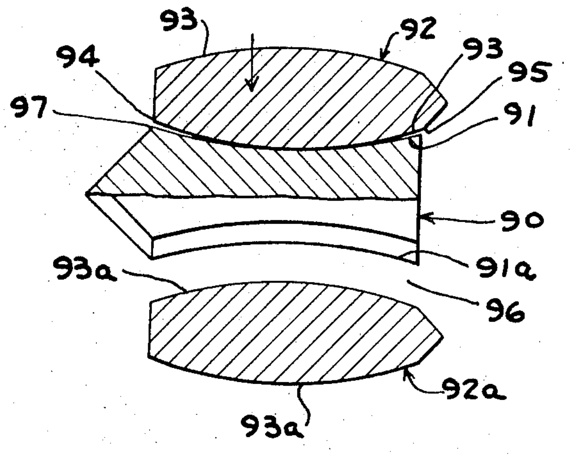

FIG. 16 is a diagrammatic sectional view showing engagement of teeth of two external members, with the teeth faces thereof being modified in accordance with the present invention.

Figure 16A:
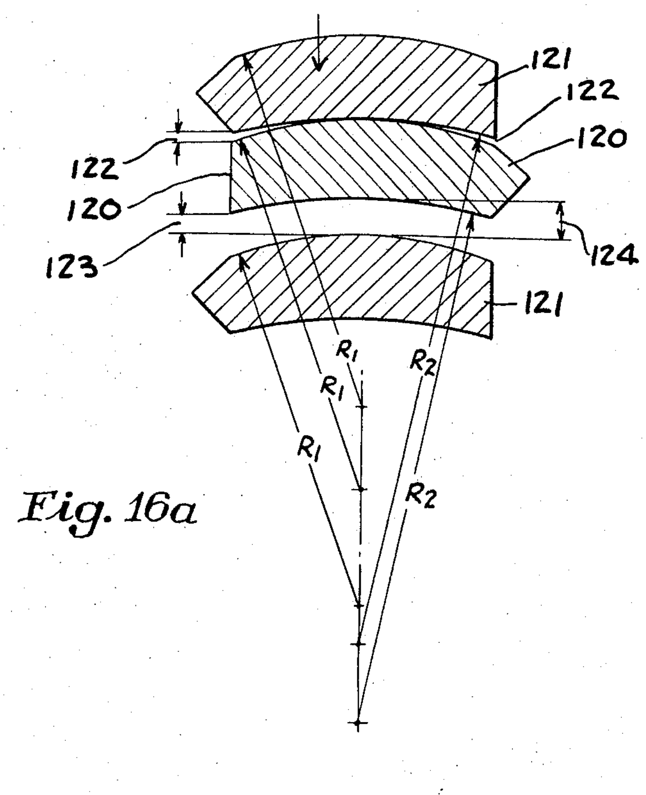

FIG. 16*a* is a view similar in part to FIG. 16 but illustrating two engaged toothed elements in which teeth of both of said elements are concaved on one side and convex on the opposite side.

Figures 17, 18:
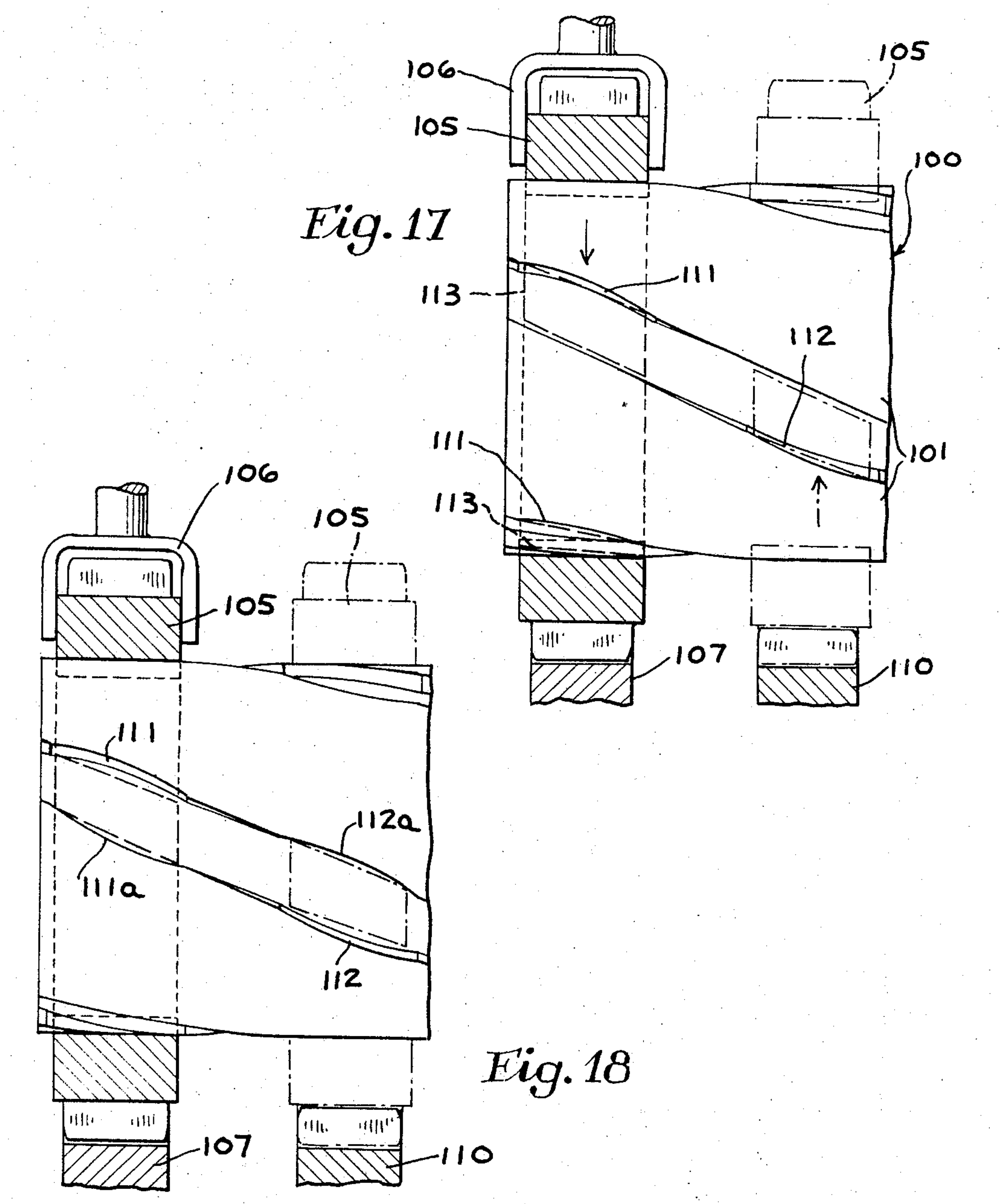

FIG. 17 is an elevational view, partly in section, showing a further opplication of the engageable elements of a modified construction but embodying the present invention.

FIG. 18 is a view similar in part to FIG. 17 but showing a construction including holding or disengagement-resisting means operative in the conditions of rotation and application of torque in both directions in either of the two positions of the driving or driven members.

It will be understood that the drawings show the features of the toothed elements embodying the present invention in an exaggerated manner to permit the necessary geometric constructions, since the nature of said features cannot be clearly illustrated otherwise. It is to be understood further that although the present invention has been illustrated and described herein with reference to toothed members with their holding or nesting recesses provided in the flanks of tooth surfaces, i.e. working faces, of the female member teeth, with the mating male member teeth being received in such recesses, the present invention is successfully applicable to constructions in which the nesting recesses are provided in the external teeth of the male member and where the nesting teeth of the female member may engage with the external teeth and nest in the recesses thereof.

It is to be understood that the invention is not limited in its application to the details of construction and arrangemen of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

In the drawings there are shown, by way of example, several constructions embodying the present invention. Referring specifically to FIG. 1–6, the same illustrate a power transmission including two meshable or engageable gear members adapted to be moved into and out of mesh for the purposes of drivingly connecting and disconnecting the driving and the driven members for the purposes well known in the art.

Figure 2:
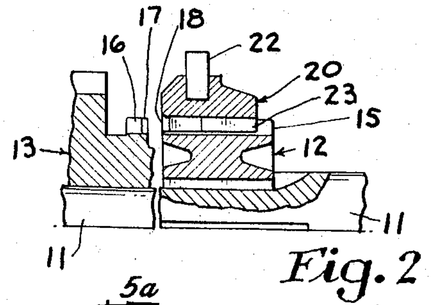
FIG. 2 is a fragmentary view showing on an enlarged scale and in section the portion encircled in FIG. 1 by the circle 2, with the toothed elements shown disengaged.
Figure 1:
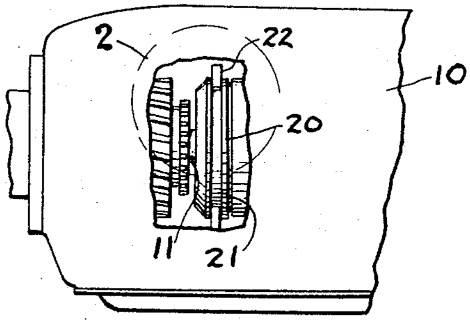
FIG. 1 is a fragmentary elevational view of a motor vehicle transmission embodying the present invention, the transmission being shown with the housing thereof being broken away to expose to view two toothed elements or members adapted for selective engagement and disengagement.

FIG. 1 illustrates a power transmission having a housing 10 in which there is operatively mounted transmission mechanisms including a shaft 11 on which there are mounted external toothed members or gears 12 and 13, see FIG. 2. The spline member 12 is affixed to the shaft 11, which spline member 12 drives the slidable and shiftable splined sleeve member 20, so that said shiftable member 20 may engage with its internal clutch teeth 23 integrally cut external clutch tooth 16 on the gear 13, rotating freely on the shaft 11. The clutch teeth geometry of both mating members 20 and 13 is substantially the same for engagement to one another. All members 11, 12, 20 and 13 are co-axially mounted. However, the members 12 and 13 are not connected with each other drivingly except through the slidable or shiftable member 20 in a manner described below, see FIGS. 1, 2, and 3.

For drivingly connecting and disconnecting the members 12 and 13, the shiftable member 20 is provided with a peripheral groove 21, see FIG. 1, at which the member 20 is engaged by a shifting fork 22. The member 20 is of annular construction and has provided on its inner cylindrical surface a plurality of internal teeth 23 which are in constant mesh with the teeth 15 of the member 12, but may be selectively in or out of mesh with the teeth 16 of the member 13. FIG. 2 shows the member 20 having its teeth 23 constantly engaging the external teeth 15 of the member 12 but being out of mesh with the teeth 16 of the toothed member or gear 13. In such a condition the toothed members 11, 12 and 20 rotate together and independently of the member 13 which is not in driving connection therewith.

In FIG. 3 the member 20 is shown shifted to the left, with the left-hand portions of its teeth 23 meshing with the teeth 16 of the member 13 but without coming out of mesh with the external teeth 15 of the member 12. In such a condition the members 12 and 13 are drivingly connected through the member 20 and rotate together with the shaft 11. The adjacent ends of the teeth 16 and 23 are "pointed" or beveled as is indicated at 17 and 18 in order to facilitate engagement of said teeth. It will be noted that a synchronization ring usually provided in automotive transmissions is omitted herein for the purpose of clarity of the drawings.

The construction so far described is a conventional one, and no further detailed description thereof is deemed necessary for proper understanding of the invention.

As explained before, in operation of conventional transmissions there occurs strong tendency for undesirable and objectionable self-disengagement of clutch teeth of members, such as those of the member 20, from the clutch teeth such as teeth 16 of the member 13, thus causing loss of control between the driven member and the driving member. In cases involving movement of heavy masses such disengagement may have serious safety implications, since loss of control of such masses can result in serious accidents.

Figure 4:
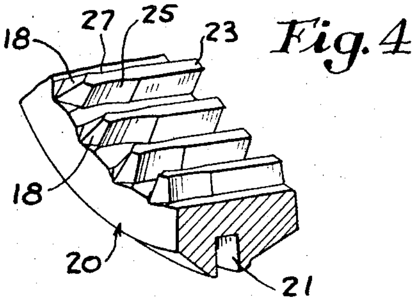
FIG. 4 is a fragmentary perspective view showing the spline tooth construction of the shiftable element.

In accordance with the present invention, in order to prevent such self-disengagement, there are provided in the working faces of the teeth 23 recesses such as those designated in FIGS. 4–6 by the numerals 25 and 27. Since all of the teeth 23 and the recesses 25 and 27 thereof are all of the same geometrical construction, they are described herein with reference to only one of such teeth. The recess 25 is provided only in a portion of the total length of the tooth 23. The recess is substantially longer than the tooth 16 and may terminate shortly before reaching the pointed end 18 of the tooth 23, leaving a straight portion 26, as is best shown in FIGS. 5 and 6. However, under certain conditions the recess may be brought to the pointed end of the tooth and provide a substantially sharp corner thereat, maintaining the chordal tooth thickness at 26 of normal or of reduced magnitude. By virtue of such geometrical construction, when the teeth 23 of member 20 are drivingly engaged with the teeth 16 of member 13, the teeth 16 are received within the recesses 25 or 27, depending on the direction of rotation of the member 20. With the direction of rotation as indicated by an arrow in FIG. 5, the tooth 16 is received in the recess 25, with a clearance occuring in the trailing recess 27.

In operation, presuming that there is clearance between the end of the tooth 23 of the shiftable member 20 and the wall formed by the body of the member 13, the tooth 23 will tend to adjust itself substantially at the middle of the recess 25, see FIG. 5. This will occur due to the forces tending to move the recessed tooth 23 toward its middle position becoming balanced at such position, and any tendency of the tooth 23 to move beyond that position will be resisted by greater forces than those tending to move it to the middle position.

It is of importance that in accordance with the present invention the corner edges 30 and 31 of the teeth 16 are originally left sharp or substantially sharp, i.e., as they are formed by machining, and therefore they contact the sloping walls **25*a* and 25*b* of the tooth 23 at said recess 25 at substantially line contacts, or "edge-to-surface" contacts. Such contacts appear ats point contacts in the sectional views. As operation of the transmission progresses, there occurs mutual wear of the teeth 23 and 16 at the contacting surfaces along said line contacts thus providing contacts of substantial areas created by the wear. Such wear progresses generally in the direction of the lowermost point of the recess cross section. As the wear progresses, it causes self-improvement of contact areas and increasing them to substantial widths providing for safe and efficient transmission of load forces. It will be understood in this connection that in the drawings the angles of such sloping walls are exaggerated for the sake of clarity, and that the actual depth of the recesses such as recess 25 and 27 may be only .010" to .012" at the bottom of the arcuate recess. Accordingly, the chordal length of said arcuate recess must extend beyond the driving corners 30 and 31 of tooth 16** in order to form arcuate ramps for said corners to resist their axial movement, see FIGS. 5 and 5*a*.

The condition resulting from the wear is best illustrated in FIG. 6. It should be appreciated that such wear occurs at each line of contact of all teeth around the entire peripheries of both members, with each pair of contacting teeth wearing down in proportion to the load they carry. The higher points of contact will be in contact first and will carry greater loads. However, as operation of the device progresses, the loads will be gradually and progressively disturbed between all teeth of the members thus correcting the effect of allowable manufacturing tolerances in the spacing of the teeth, and limiting the maximum load carried by individual teeth.

It is of importance to appreciate that provision of curvelinear walls, and particularly walls which appear in cross-sectional views as an arc, has a very important advantage illustrated in a greatly exaggerated manner in FIG. 13. Referring to said FIG. 13, the member 73, corresponding to the member 23 of FIG. 5, is shown with a recess appearing as the arc 74, with said arc, as shown, providing a recess of greatly exaggerated depth in order to permit the geometric construction explained below. The numerals 75, 76 and 77 illustrate three positions of a portion of the contacting tooth, resulting in establishing contact points **75*c*, 76*c* and 77*c*. Tangents to the arc 74 constructed at said points 75*c*, 76*c* and 77*c*** show the accelerated increase in the resulting tangential angles A, B and C. Such accelerated increase in the angles A, B and C causes accelerated increase in resistence to the axial disengaging movement of the members as the point of contact moves upwardly on the arc.

It is to be understood that recesses such as 25 and 27 shown in FIG. 5 and like recess shown at 74 of FIG. 13 may be employed in either member, such as the male spline tooth or female spline tooth, to provide the same resultant nesting conditions of the alternative mating member tooth in said recess.

It will now be seen in view of the foregoing, that with the recesses having curvilinear forms, such as those having arcuate form in sectional views, the tangential angle, and therefore the angle of the direction of axial disengaging movement of the members, varies from zero degrees at the bottom of the arc to a predetermined or preselected angle at its terminals. In selecting the precise shape and dimensional specification of the recess and particularly the radius and depth of the arc, it is important that the same be so selected as to provide for secure holding of the shiftable member in engagement under load conditions from minimum to maximum but at the same time to prevent undersirably high resistence to intentional disengagement. In other words, the recess and the slope of its walls must be sufficiently deep and its walls sufficiently steep to insure such secure holding but not too deep or too steep as to retard or to resist too strongly smooth and easy selective shifting of the member, such as member 20, for selective or intentional disengagement under reduced torque load.

With the use of arcuate recesses, increase in the tangential angle at the point of contact between the teeth of the two mating members produces increase in resulting resistence at an accelerated rate as the point of contact advances up the incline, said increasing resistance commencing from the bottom of the arc in either direction of axial movement, thus securing the intended axial positioning of the engaged toothed members. This is an important feature of the present invention since as the forces producing tendency of the members to disengage increase, the contacting tooth tends to climb up on the sloping wall or ramp, cousing the tangential angle and the resulting resistence to its further movement also to increase and thereby overcoming the disengaging forces, counteracting self-disengagement. The resulting position of the contact point is established where the forces balance. I have found, for example, that use of arcs having tangential angles at the usual or normal point of contact equal to approximately 2°–3°, have given good results in a number of applications, while a tangential angle of 10° has not interfered with selective disengagement.

It should be understood that the "ramp angles" at points of contact are governed in a large measure by the torque transmission requirements.

FIGS. 7–8 illustrate the condition in which the member 33 corresponding to the member 13 of the construction of FIGS. 1–6 has a very narrow neck as indicated at 34. In accordance with the invention, in order to produce proper seating of the tooth 36 corresponding to the tooth 16 of the construction of FIGS. 1–6, all of the external teeth 36 of the member 33 are beveled as indicated at 37. This construction provides holding tooth members in a drive position between points 23*c* and 36*c*, preventing axial movement of the slidable member such as 20.

It is important to appreciate in this connection that with such a construction it is necessary to have the pointed tooth end of slidable member, such as the member 20 of FIGS. 1–4, contact the member such as 33 of FIGS. 7 and 8. Such a condition is illustrated in FIG. 8, wherein the tooth 23 is shown contacting member 33 at 23*c*. Under such a condition each tooth 36 will have only one line contact with the respective tooth 23 at the recess thereof, as indicated at 36*c*, and clearance at its opposite edge 36*d*. Also, the entire trailing side of the tooth 23 will be out of contact with the tooth adjacent to that trailing side, see FIG. 8.

FIG. 9 illustrates a particularly deep beveling of the external teeth, such as illustrated at 38, causing the tooth 39 to seat well within the recess and thus to increase the self-centering effect of the tooth. However, in order to provide for such self-centering of the tooth, the same must be free-floating, which condition requires contact at two points 39*c*, and freedom from interference by other members. Particularly, sufficient clearance must be provided between the pointed end 23*d* and the wall of the member 33, as shown. There also will be clearance at trailing side of the tooth 23 as described above with respect to FIG. 8. Such a construction is often desirable where the length of the tooth such as 23 is limited and thereby demands reduction of the chordal length of the recess arc or its equivalent for the above intended purposes.

FIG. 10 illustrates a modified construction of the tooth with the recess being formed by two sloping planes, which appear in the sectional view as two substantially straight lines 40 and 41 forming at their intersection a predetermined angle. A filler of a desired radius or a suitable relief may be provided at said point, as indicated by 42.

Under certain conditions and particularly when recesses may be especially long, the angle of the slope of the recess walls may produce a recess of an appreciable depth. In order to prevent weakening the recessed tooth at the point of maximum depth of the recess, the middle portion thereof which is, in fact ineffective, may be formed to eliminate excessive depth, preserving however ramps of desired extent for driving line contact with the mating tooth corner.

FIG. 11 shows a construction substantially similar to that of FIG. 10 except that the planes forming the recess and appearing in the cross-section of the tooth as straight lines are of different lengths, the shorter line being approximately one-quarter of the total length of the recess but still providing proper self-centering bearing for both lines of contact of the engaged teeth.

In the construction of FIG. 12 the recessed tooth 50 has an inclined plane or ramp 51 which is substantially straight in its cross-section. The pointed end of the tooth 50 abuts or "heels" at the point 52. The mating tooth 53 has a substantially line contract with said ramp 51 at its corner 54. In the process of disengagement when the tooth 50 moves away from the wall 55 with its end losing contact with said wall, the corner 54 of the tooth 53 rides up on said ramp 51, resisting disengagement of the teeth, until it reaches the corner 56 at the pointed end of the tooth 50, whereupon the corner 56 rides on the surface 57 of the tooth 53 until disengagement is completed. Thus corner-to-surface driving contact prevails substantially throughout the entire disengaging movement of the tooth 50.

It is to be understood that the contacting corner 54 of the tooth 53 illustrated in FIG. 12 may be at the opposite end of the tooth face 57, said opposite contacting corner designated by 58, with angular clearance being provided along the tooth face 57 of the tooth 53 in relation to the angular tooth face 51 of tooth 50. It should be noted that in such a construction there will exist corner-to-surface driving condition along the ramp, with said condition continuing through a period of greater duration and entirely along the ramp 51.

In FIG. 14 the tooth 60 is substantially similar to tooth 50 of the construction of FIG. 12 except that there is a clearance between its pointed end 61 and the wall 62. Accordingly, the tooth 63 contacts the ramp 64 of the tooth 60 with its corner 65 (on the left-hand side in the drawing) and may also contact the relatively steep ramp portion 66 with the surface of its corner 67 (on the right-hand side of the drawing).

It is an important feature of the present invention embodied in this construction that the surface 68 of the tooth 63 is not parallel to the center line of the tooth 63 but forms an angle D therewith, and an angle E with the ramp 64, thus providing a higher stress locality at the corner 65. The angle D is so selected that the resulting angle E, and therefore the clearance between the surfaces 68 and 64, is small enough to substantially close and thus to produce a substantially surface-to-surface contact should an impact load suddenly occur at the substantial line contact at the corner 65. However, such closing of the clearance produced by the deflection of the meshing teeth is still within the elastic limit of the material thereof and does not result in permanent set or distortion of the mating teeth. By virtue of such a construction the possibility of breakage or permanent distortion of the teeth of the engaged elements under impact loads is virtually eliminated.

In the construction of FIG. 15 the recess in the tooth 80 has a flat bottom 81 substantially parallel to the axis of the member. In consequence thereof the tooth 82 rides thereon with its surface 83 in a substantially surface-to-surface contact as is shown in solid lines in FIG. 15. However, after disengaging movement of the tooth 80 begins, the corner 84 of the tooth 82 rides on the ramp 85, establishing therewith a substantially line contact, whereupon disengagement of the elements proceeds in accordance with the explanations given above with respect to other constructions embodying the present invention. It will be understood that the provision of the ramp 85 on the tooth 80 is not limited to cutting a recess on said tooth, or on any other similar or illustrated tooth, but may be attained by swaging or upsetting the end of the tooth following the process of pointing said tooth or otherwise.

In the construction of FIG. 16 the tooth 90 is provided with arcuate recesses 91 and 91*a*, while the engageable teeth 92 and 92*a* are machined to provide also arcuate or generally arcuate convex surfaces 93 and 93*a* of a like or similar radius. By virtue of such a construction under light load conditions of the engagement there may exist a predetermined clearance at corners 94 and 95 on the engaged or driving side of tooth 92, and a predetermined or backlash clearance on the trailing side as indicated at 96. Because of such construction the toothed members self adjust themselves axially, thus seeking and self-centering the mating teeth, producing central transmission of the load through the mating teeth. When disengaging movement starts, however, the surface 93 of the tooth 92 rides out on the corner 97 of the tooth 90. The like condition also exists under load rotating the engaged members around their common axis in the opposite direction. The construction described above also has an important advantage of providing a quieter running pair of gears as well as the advantage of self-adjustment of such gears compensating for angular misalignment of their axis, in addition to self-centering of the gears along the axis.

FIG. 16*a* illustrates a construction similar in part to that of FIG. 16 but showing two engaged toothed elements in which teeth of both members are cut in the same manner by being concaved on one side and convex on the opposite side. This feature gives a very important advantage in many situations. It will be noted that in the construction of FIG. 16 all of the teeth of one member are concave on both sides, while all of the teeth of the other member are convex on both sides. However, during axial movement for engagement or disengagement of the teeth of the members, the condition of riding out on a corner still exists in both constructions.

In FIG. 16*a* the driven tooth is designated by the numeral 120, and the driving tooth by the numeral 121. The convex side of the teeth has a radius $R_1$ which is smaller than the radius $R_2$ of the concaved side, thus providing clearance 122 at the ends of the teeth 120 and 121. The numeral 123 designates the clearance required for disengagement, and the numeral 124 designates the back lash.

It is also to be understood that the construction of the nature illustrated in FIGS. 16 and 16*a* has a number of important advantages in application of toothed members not including axial disengagement thereof, i.e., in applications such as including permanently engaged toothed members, and may be successfully used in such applications. In such applications it is not necessary to provide more back lash than is required for free running gears. However, provision should be made for a desired amount of axial floating of at least one toothed member in engagement. It will also be understood, that by providing full mating radii on both sides of respective teeth, additional important advantages in accordance with the present invention can be attained. Such construction provides for self-centering of the toothed members; compensates for axial misalignment, off lead of helical gear teeth and other manufacturing variations difficult and expensive to control in conventional constructions. This construction is applicable to both spur and helical gear teeth.

FIG. 17 shows a modified mechanism for drivingly connecting with the aid of a sliding member and in a selective manner a driving shaft with either one of two separate gear trains. Such selective driving connection may be required for the purposes similar to those of the transmission illustrated in FIGS. 1 and 2.

Referring specifically to FIG. 17, the driving shaft 100 of the construction shown therein is provided with teeth 101. The teeth 101 may be of a straight spur or helical form, with straight sides or involute sides. A sliding gear 105 provided with internal spline teeth engaging said teeth 101 is axially shiftable or slidable on said shaft 100 and is driven therefrom. A shifting fork 106 embracing the gear 105 and manually operated, such as with the aid of a suitable handle, is adapted to shift the gear 105 on said shaft. In its position shown in FIG. 17, the gear 105 is in driving connection with the gear 107, thus engaging the gear train controlled by gear 107. A gear 110 mounted co-axially with the gear 107 adjacent thereto and having teeth of such dimensional specifications as to be engageable by the teeth of the sliding gear 105 controls another gear train. As the gear 105 is moved axially on the splined shaft 100 toward the gear 110, it comes out of the engagement with the gear 107 and comes into engagement with the gear 110, as indicated in FIG. 17 in phantom lines. In such a position the gear 105 engages the gear 110 and the gear train controlled thereby.

In accordance with the present invention, in order to prevent undesirable self-disengagement of the gear 105 there are provided means integral to the member 100, which means decrease to a minimum the possibility of such self-disengagement, thus supplementing or eliminating other outside means for holding the members in predetermined engagement. In the construction of FIG. 17 said means are exemplified by a plurality of recesses such as 111 and 112 provided in the walls of the teeth 101, which recesses are substantially similar in their construction and functions to the recesses such as 25 and 27 of the construction of FIG. 5. The internal spline teeth 113 of the gear 105 nest themselves in said recesses similarly to the teeth 16 of the construction of said FIG. 5. Such a condition prevails when rotation of the shaft 100 is in the direction indicated in FIG. 17 by an arrow in solid line, illustrating the driving contact through the corners between the teeth 113 of the gear 105 with the teeth 101 of the shaft 100.

When the gear 105 is shifted into the position indicated in FIG. 17 in phantom lines, for engagement of said gear 105 with the gear 110 and reversing the direction of rotation and torque between the gears 105 and 100, the internal teeth 113 of the gear 105 nest themselves in the recesses 112 provided on the opposite sides of the adjacent teeth 101.

FIG. 18 shows a construction similar in part to that of FIG. 17 but including holding means provided for reversing direction of rotation and application of torque in either of the two positions of the gears 105 without shifting said gear. Such a feature is desirable, for instance, in a power transmisison when the driving forces are directed by impact means and/or where said driving forces may be overcome by the driven forces, thus reversing the lines of contact between the teeth 113 of the gear 105 and the 101 of the shaft 100. In such a construction recesses **111*a* are provided opposite the recesses 111 and recesses 112*a* opposite the recesses 112 on the walls of the adjacent teeth of the shaft. It is to be understood that in FIG. 17 and FIG. 18, gear 105 shall pilot for axial centrality with the member 100, thus being rotated by the teeth 101 and 113**, respectively.

It will be understood that the devices illustrated in FIGS. 17 and 18 may also be improved in accordance with the present invention, in their conventional or improved constructions by forming the faces of the external teeth of the gears 105 on one side and of the gears 107 and 110 on the other side of the construction, in a manner substantially similar to that illustrated in FIG. 16 and FIG. 16*a*.

By virtue of the above disclosed constructions, the objects of the present invention listed above and numerous additional objects and advantages are attained.

I claim:

1. In a combination, two machine members each having a plurality of circularly arranged teeth and engageable and disengageable with each other by axial movements of said members, one of said members having working faces of its teeth recessed to receive the entire driving portion of the meshing teeth of the other member within said recesses, respectively, but at least one meshing tooth being during engagement fully engaged for transmission of torque and having only a substantially edge-to-surface contact with its meshing recessed tooth, the adjacent surfaces of the meshing teeth forming an angle determining clearance therebetween at normal load conditions, said angle being so selected that when an increased load occurs, said teeth deflect whereby said surfaces meet to produce a momentary substantially surface-to-surface contact on said tooth and producing driving contact on a plurality of teeth around the axis of said members within the elastic limit of the tooth material.

References Cited

UNITED STATES PATENTS

| | | | |
|---|---|---|---|
| 1,935,965 | 11/1932 | Wahlberg | 192—67 |
| 2,049,127 | 7/1936 | Maybach | 192—67 |
| 3,043,158 | 7/1962 | Herr | 74—462 |

BENJAMIN W. WYCHE III, *Primary Examiner.*